United States Patent
Ouyang et al.

(10) Patent No.: US 11,882,173 B1
(45) Date of Patent: Jan. 23, 2024

(54) CAPTURE NETWORK COMMUNICATION VIA CLIENT EXTENSION

(71) Applicant: SAP SE, Walldorf (DE)

(72) Inventors: Qunzhi Ouyang, Shanghai (CN); Fei Tan, Shanghai (CN)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 17/942,371

(22) Filed: Sep. 12, 2022

(51) Int. Cl.
| | | |
|---|---|---|
| H04L 12/16 | (2006.01) | |
| H04L 29/08 | (2006.01) | |
| H04L 29/06 | (2006.01) | |
| H04L 67/02 | (2022.01) | |
| G06F 15/16 | (2006.01) | |
| G06F 9/54 | (2006.01) | |
| G06F 8/70 | (2018.01) | |
| G06F 8/60 | (2018.01) | |
| G06F 9/44 | (2018.01) | |

(52) U.S. Cl.
CPC .................................. H04L 67/02 (2013.01)

(58) Field of Classification Search
USPC ....................................................... 709/201
See application file for complete search history.

(56) References Cited

U.S. PATENT DOCUMENTS

| | | | |
|---|---|---|---|
| 6,792,607 B1* | 9/2004 | Burd | G06F 16/972 707/999.102 |
| 2005/0050164 A1* | 3/2005 | Burd | G06F 9/451 709/217 |
| 2008/0069011 A1* | 3/2008 | Sekaran | H04L 67/1008 370/260 |
| 2009/0165099 A1* | 6/2009 | Eldar | H04L 41/0869 726/5 |
| 2011/0191791 A1* | 8/2011 | Seyvet | G06F 9/465 719/328 |
| 2017/0371723 A1* | 12/2017 | Chrysanthakopoulos | H04L 67/51 |
| 2019/0075180 A1* | 3/2019 | Yadav | G06F 9/451 |

* cited by examiner

*Primary Examiner* — Jude Jean Gilles
(74) *Attorney, Agent, or Firm* — Sterne, Kessler, Goldstein & Fox P.L.L.C.

(57) ABSTRACT

Disclosed herein are system, method, and computer program product embodiments for extending HTTP clients to capture network traces in applications. The application may initiate a network request, and if the network request fail or generates an error message, the application may export a listening record for analysis. The analysis may understand the failed network request and improve network communication of the application and the web server.

20 Claims, 6 Drawing Sheets

CAPTURE NETWORK COMMUNICATION VIA CLIENT EXTENSION

BACKGROUND

When, for example, an external application initiates a network request, the network request may fail or generate an unexpected abnormal error message in the application. A third party tool may be used to address this issue, but this implementation is often too complicated or there is no targeted sniffing of the specified external application.

Third party tools often require opening the proxy and setting the port, which may affect a network request of the entire operating system. The sniffed data information may be too complicated to be classified into categories. Additionally, some third party tools do not work on a virtual private network (VPN) environment, which is advantageous due to security issues.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Figure 1:
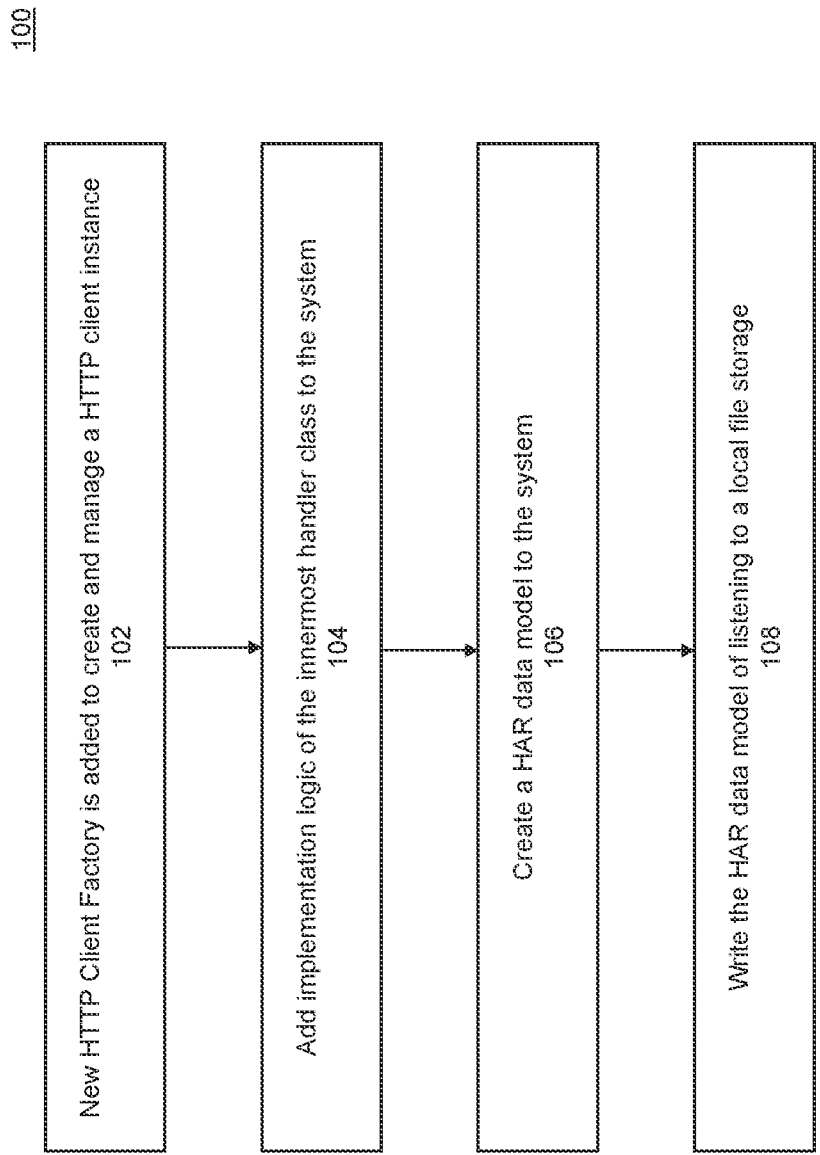
FIG. 1 is a flowchart related to a Hypertext Transfer Protocol (HTTP) Archive (HAR) format file, according to some embodiments.

Provided herein are system, apparatus, device, method and/or computer program product embodiments, and/or combinations and sub-combinations thereof, for extending a framework HTTP client class to capture network traces in an application. The HTTP client may be used in the programming language C#, for example. Additionally, the framework may include the DotNet Standard 2.0.

Communications between an application and network or web server may involve listening and recording. By listening and recording, exceptions in the normal communication between the application and network or web server may be continuously tracked. Specifically, improving network communication may be done by listening and recording network requests and responses information between an application and a network or a web server. For example, when the application initiates a network request, it may separately listen to the request and a response and associated information within the application, and then record such request and response information.

An application may initiate a network request and a flag may be set to indicate whether the listening and recording is turned on or off. A local data file may be created to store messages of the listening and recording in a sequential way. The local data file may store the listening and recording messages one by one, separated by line-ending. Additionally, the local data file may be encrypted. The listening and recording may be appended to the local data file such that the local data file does not need to be loaded into the memory. The traces of listening and recording may be exported to an HTTP Archive (HAR) format file. A HAR format file may be stored within a local data file.

In some embodiments, it is advantageous to use HAR as a file format, as the format is supported by various software. HAR is a JSON (JavaScript Object Notation) archive file format, which may log, for example, a web browser's interaction with a site or an application. The JSON format allows storing of simple data structures and objects within a file and is a format that is standardized and convenient for data analysis. Additionally, the HAR format defines an archival format for HTTP transactions, which may be used by a web browser to export detailed performance data about the web pages it loads.

Data analysis may be provided or performed, for example, by a debugging tool that is included in internet browsers. A HAR data file may be directly imported into a network tab of the internet browser for viewing and analysis, or into other third party tools.

When a network request fails or some unexpected abnormal error message occurs in an application, a listening and recording record, stored as a local data file, may be exported for analysis to find the problem. This local data file may be used to continuously improve the network communication of the application. Additionally, the local data file may be used for further data analyses and statistics.

By listening and recording HTTP network requests and responses within an application, a third party tool may not be required. Additionally, proxy forwarding may not be required, but may be set to be switched on or off. The HTTP network requests and responses may trace regardless if the proxy is on or off.

FIG. 1 illustrates a method to listen, record, and analyze information flow between an application and a network, according to one embodiment. The method includes adding a HTTP client factory class, adding implementation logic, creating a HAR data model, and writing the HAR data model to local file storage.

At 102, a new HTTP client factory is added to create and manage a system, which contains classes of HTTP attributes. The HTTP client factory may also create HTTP client instances.

At 104, implementation logic of an innermost handler class is added to the system. The innermost handler class is a class that may inherit and rewrite method logics or may also process network requests and responses. For example, the innermost handler class may inherit the implementation to the system. Additionally, a type of HTTP handlers that delegate the processing of HTTP response messages to another handler, may be referred to as the innermost handler.

At 106, a HAR data model is created at the system.

At 108, the HAR data model is used to write in a file on a local file storage information captured via listening and recording the exchange between the application and the network, where the file may be used for further analysis. For example, the file may be analyzed to determine any error messages from the listening and recording.

The steps 102-108 are further described below.

Step 102

In step 102, a new HTTP client factory class may be added to create and manage the system, which contains classes of HTTP attributes. The HTTP client factory class creates a HTTP client class instance. This HTTP client class may be implemented in a framework, for example in DotNet Standard 2.0. The HTTP client factory class may be a factory management class and may be written as a singleton mode. Singleton mode refers to design patterns in program development and design and is the summary of the code development experience of its predecessors and may have only one unique instance. Additionally, static properties may be added, such as opening or closing the listening and recording settings to be used later. It may be decided on whether or not it is necessary to enable the HTTP request listener or recorder, but the default is false.

An HTTP client factory interface function may be added, for example, to the HTTP client factory class. The HTTP client factory interface function may be an asynchronous function such that the HTTP client instance may be returned asynchronously. The innermost handler class may be assigned to the new HTTP client instance, which may be used to process network requests and responses. For example, adding the H TTP client factory interface function may be performed by the following code. It should be noted that this code example (as well as other code examples included herein) are provided solely for illustrative purposes, and is not limiting. Other code examples could alternatively be used.

```
public async Task<HttpClient?> CreateHttpClient( )
{
    InnermostHandler handler=new InnermostHandler( );
    HttpClient httpclient=new HttpClient(handler);
    //More logic implementation . . .
    return httpclient;
}
```

Step 104

In step 104, an implementation logic of the innermost handler class may be added. By adding the innermost handler class, the implementation is inherited from a HTTP client handler parent class of the system. By using the HTTP client handler parent class of the system, the interface function for sending network requests is already implemented in the innermost handler class in step 102. The interface function may be rewritten such that code logic is added to perform listening or recording before and after a request is implemented.

For example, two functions may be created to implement listening and recording, such as 'listening before sending' and 'listening after sending'. These two functions may be called before and after the interface function. Additionally, these two functions are considered private, as they are not available to users outside of the application of the system.

For example, the two functions may be performed by:
```
protected sealed override async Task<HttpResponseMessage>
SendAsync(HttpRequestMessage request, CancellationToken cancellationToken)
{
    ListenerBeforeSend(request);
    var response=await base.SendAsync(request, cancellationToken);
    await ListenerAfterSendAsync(request, response);
    return response:
}
```

The function for 'listening before sending' has the capability to record the content of a message submitted by a request before sending the network request once it is switched on. Within this function, the properties of opening or closing the listening set in the HTTP client factory class may be further determined. For example, the content of the request submitted may be listened to by the request. In order to listen, HAR entries in a data model class are created for interception. The HAR entries will include the request time, network address, request submission content and cookies information into the HAR data model. These HAR entries are written into the HAR data model.

For example, the HAR entries written to the HAR data model may be performed by:
```
private void ListenerBeforeSend(HttpRequestMessage request)
{
    if (HttpClientFactory.EnabledListener)
    {
        HAREntries entries=new HAREntries( );
        entries.startedDateTime=DateTime.UtcNow;
        entries.serverIPAddress=
        Dns.GetHostAddresses(request.RequestUri.Host)[0].ToString( );
        entries.request=new          HARRequestMessage(request)
            {cookies=
        CookieContainer.GetCookies(request.RequestUri)};
        request.Properties.Add("HAR-ENTRIES", entries);
    }
}
```

To associate a specific request with a response, a HAR entries keyword may be specified. This keyword may be used for searching in a cache and may be added to the HAR entries of the HAR data model to a properties list of a request instance for caching.

The function for 'listening after sending' may have the capability to listen to the content of a response message recorded after sending a network request. Within this function, it is checked whether the detection is turned on or off. Additionally, it may be checked whether there is a HAR entries, which is a class instance, of the HAR data model associated with the HAR entries keyword in the property collection of the request object.

For example, the listening to the content of the response message recorded may be performed by:
```
private async Task ListenerAfterSendAsync(HttpRequestMessage request,
HttpResponseMessage response)
{
if (HttpClientFactory.EnabledListener &&request.Properties.ContainsKey(HAR_ENTRIES))
    {
    try
    {
    HAREntries    entries=(HAREntries)request.Properties
        ["HAR-ENTRIES" ];
    entries.time=
    entries.startedDateTime.Subtract(DateTime.UtcNow)
    .Duratiomo.TotalMilliseconds;
    entries.response=new HARResponseMessage(response)
    {cookies=
CookieContainer.GetCookies(response.RequestMessage.RequestUri)};
```

```
    await HttpClientListener.GetInstance( ).WriteIsolated-
StorageAsync(entries);
    request.Properties.Remove("HAR-ENTRIES");
    }
    catch (Exception ex)
    {
    //log exception . . .
    }
    }
    }
}
```

If such an association exists, the content of the response message associated with the request will be listened to and recorded. If no association exists, no processing is performed and the HAR entries from the properties field of the request instance will be removed. Simultaneously, the response time may be written, along with the response message content and, e.g., cookies, information into the HAR entries of the HAR data model. The HAR data model may then be serialized, which means the listening and recording record is stored in the order it was listened to and recorded. The HAR entries of the HAR data model associated with the HAR entries keyword in the specific request may be removed from the properties collection after being serialized and persisted.

Step 106

In step 106, a HAR data model may be fully created at the system level. The HAR data model may be an HTTP archive format class. In some embodiments, the HAR model may be structured based on HTTP Archive 1.1, in a JSON format, and may include HAR object types such as log, creator, browser, pages, entries, requests, responses, cookies, headers, queries, parameters, content, cache, and timings. The HAR data model may also be referred to as an HTTP archive format, since it is of the HTTP archive format class. The structure of the HTTP archive format class is divided into four layers that are nested: HAR data model to a HAR log class to HAR entries to request and response messages.

The HAR log class may include multiple attributes. The attributes may be a collection that may store multiple instances of the HAR entries class since the four layers are nested. The main attributes used within the HAR entries class may be, for example, start date time, request, response, server IP address, or overall processing time.

A request attribute is a HAR request message data model class and a response attribute may be a HAR response message data model class. The HAR request message class may be related to step 104, described above. The HAR request message class may be instantiated in the listen before send function and the request attribute of the entries object may be assigned. The HAR message request class' role is to convert the network request message into the HAR request message data model. The conversion of the network request message into the HAR request message data model may include the request method, such as get or post, the network address, submitted form, or cookies.

For example, the HAR request message class for request message may be performed by:

```
internal class HARRequestMessage
{
    public HARRequestMessage( ){ }
    public    HARRequestMessage(HttpRequestMessage
request)
    {
    Request=request;
    HasRequest=request !=null;
    If(HasRequest)
    ProcessData( );
    }
    private bool HasRequest=false;
    protected HttpRequestMessage? Request{get; private
set;}
    private string_method,
    public   string   method   {get{return   HasRequest?
Request.Method.method: _method;}
    set{_method=value;} }
    private string_url;
    public string url {get{return HasRequest? Request.Re-
        questUri.ToString( )                    ):           _url;}
        set{
    _url=value;} }
    private string_httpVersion;
    public   string   httpVersion   {get{return   HasRequest?
"HTTP/"+Request.Version.ToString( )
    :_httpVersion} set{_httpVersion=value;} }
    //Gets the collection of HTTP request headers.
    public List<HARNameValue> headers {get; set;}
    public List<HARNameValue> queryString {get; set;}
    public HARContent postData (get; set;}
    public object cookies {get; set;}
    public int headersSize {get; set;}
    public int bodySize {get; set;}
    private void ProcessData( )
    {
    Func<KeyValuePair<string,        IEnumerable<string>>,
HARNameValue> getHeaders=x=>
new HARNameValue {name=x.Key, value=string.Join(",",
x.value)};
    headers=Request.Headers.Select(getHeaders).ToList( );
    if(!string.isnullorEmpty(Request.RequestUri. Query))
    queryString=Request.RequestUri.Query.
TrimStart('?').Split('&').Select(x=>
x.Split('=')).Select(x=> new HARNameValue(name=x[0],
value=x[1])).ToList( );
    if(Request.Content=null) return:
    postData=new HARContent( );
    HttpContentHeaders
cHeaders=Request.Content.Headers:
    if(cHeaders !=null && cHeaders.Count( )>0)
    {
    headers.AddRange(cHeaders.Select(getHeaders));
    postData.size=cHeaders.ContentLength.HasValue?
        cHeaders.ContentLength.Value: 0;
    postData.mimeType=(cHeaders.ContentType !=null)?
cHeaders.ContentType.MediaType: " ";
        postData.encoding=string.Join(",",       Request.
        Content.Headers.ContentEncoding)
    }
    if(postData.size <(1024*1024))
    postData.text=GetMultipartContent(Request.Content);
}
private readonly List<string> MultpartcontentNames=new
List<string>
{"MultipartContent", "MultipartFormDataContent" };
private    readonly    List<string>    ContentNames=new
List<string>
{"FormUrlEncodedcontent", "StringContent", "JsonCon-
tent" };
private string GetMultipartContent(HttpContent content)
    {
    var cType=content.GetType( ).Name;
    StringBuilder cText=new StringBuilder( );
    var items=MultipartContentNames.Contains(cType)?
```

```
((Multipartcontent)content).ToListo:         new
List<HttpContent>( );
    foreach (var item in items)
    {
    if(MultipartcontentNames.Contains(item.Get
Type( ).Name))
    cText.AppendLine(GetMultipartContent(Item));
    }
    if(contentNames.Contains(cType))
    {
    Var txt=Task.Run(async ( )=> await
content.ReadAsStringAsync( )).GetAwaiter( ).GetReaulto;
        cText.appendLine(txt);
    }
    return cText.ToString( );
}
}
internal class HARNameValue
{
    public string name {get; set:}
    public string value {get; set;}
    public string comment {get; set;}
}
internal class HARContent
{
    public long size {get; set;}
    public string mimeType {get; set;}
    public int compression {get; set;}
    public string text {get; set;}
    public string encoding {get; set;}
}
``` internal In the listen after send function, the HAR response message class is instantiated and assigned the response attribute of the entries object. The HAR response message class' function is to convert the network response message into the HAR response message data model. It may be determined whether the request is successful, the status of the code, the response content body, or detailed information such as cookies.

For example, the HAR response message class may be instantiated by:

```
internal class HARRequestMessage
{
public HARResponseMessage( ) { }
public     HARResponseMessage(httpResponseMessage
response)
{
Response=response;
HasResponse=response !=null
If(HasResponse)
ProcessDatao;
}
private bool HasResponse=false;
protected HttpResponseMessage? Response {get; private
set;}
    private int_status;
    int status {get{return HasResponse? (int)Response.Sta-
tusCode: _status;} set{
    _status=value;} }
    private string_statusText;
    Response status description.
    public string statusText {get{return HasResponse?
Response.StatusCode.ToString( )
    : _statusText;} set{_statusText=value;} }
    private string_httpVersion;
    public string httpVersion {get{return HasResponse?
("HTTP/"+Response.Version.ToString( )): _httpVersion;}
set{_httpVersion=value;
    } }
    public List<HARNameValue> headers {get; set;}
    public HARContent content {get; set;}
    public dynamic? cookies {get; set;}
    public string redirectURL {get; set;}
    public int headersSize {get; set;}
    public int bodySize {get; set;}
    private void ProcessData( )
    {
    Func<KeyValuePair<string,    Ienumerable<string>>,
        HARNameValue>       getHeaders=x=>        new
        HARNameValue{name=x.Key, value=string.Join(",",
        x.Value)};
    headers=Response.Headers.Select(getHeaders).ToList( );
    if(Response.Content==null) return;
    content=new HARContento;
    HttpContentHeaders
        cHeaders=Response.Content.Headers;
    if(cHeaders !=null && cHeaders.Counto>0)
    {
        headers.Addrange(cHeaders.Select(getHeaders));
        content.size=bodySize=cHeaders.ContentLength.Has
            Value?
    cHeaders.ContentLength.Value. 0;
        content.mimeType=(cHeaders.ContentType !=null)?
    cHeaders.ContentType.MediaType: " ";
        content.encoding=string.Join(";",
    Response.Content.Headers.ContentEncoding);
    }
    if(content.size <(1024*1024))
    contnet.text=Task.Run(async ( )=> await
    Response.Content.ReadAsStringAsync(        ).Get
Awaiter( ).GetResultO;
    }}
```

Step 108

In step 108, the HAR data model may be used to write a file or record on a local storage, where the file includes information captured via listening and recording of the exchange between the application and the network. The file may be used for further analysis At 104, the HTTP client listener is waiting for the request to write entries to the storage and its purpose is to write the listening and recording model to local storage for asynchronous execution.

In step 108, a HTTP client listener class is created to implement subsequent code logic. The code logic may create and maintain an instance of the HTTP client listener. The HTTP client listener class is a data access storage processing class and may be defined as a singleton. Here, the singleton may have only one unique instance. The storage method, encryption, directory, file name, storage capacity, backup archive limit, or whether the amount of data is too small may also be specified within the HTTP client listener class. Directly saving the file to a local directory is convenient, fast, and easy to maintain. For example, on a Windows platform, a system isolated store function may be used.

For example, the HTTP client listener class as a singleton may be performed by:

```
private readonly IsolatedStorageFile isolatedStorage=
IsolatedStorageFile.GetStore(IsolatedStorageScope.use-
r|IsolatedStorageScope.Domain|
isolatedStorageScope.Assembly, null, null);
private const long_maxFileSizeBytes=(1024*1024)*2;
private long maxFileSizeBytes=_maxFileSizeBytes;
```

```
public long MaxFileSizeBytes{get{return maxFileSize-
Bytes;} set{maxFileSizeBytes=
(value<_maxFileSizeBytes)? _maxFileSizeBytes: value;} }
private int archiveLimit=8;
public int ArchiveLimit{get{return archiveLimit;} set(ar-
chiveLimit=(value <8)? 8:
value;} }
protected byte[ ] encryptKey; //encryption secret key.
protected Icipher encrypt; //encryption implementation.
private static HttpClientListener instance=new HttpCli-
entListenerO;
public static HttpClientListener GetInstance( )
{
return instance;
}
```

Many encryption methods exist and may vary based on the desired security level of the system. For example, an interface specification may be used and implemented based on the security level. Storage logic may also be implemented by adding an asynchronous function that may write the isolated storage, serialize the input listening and recording record model into JSON character format, and encrypt it. Isolated storage may be used to read the current storage record file, check whether the current storage record exceeds the size limit, read the duplicate copy of the current storage record, clear the current storage record, rename the duplicate copy to a new file that may be archived, and check after the archiving whether it exceeds the limit of the number of archives. For example, if the number of archives is exceeded, the over-limit archive will be cleaned up and the JSON characters will be written into the last line of the current storage record file to save, which is described in FIG. 2.

For example, an interface specification may be defined as:
```
public interface ICipher
{
byte[ ] IV {get; set;}
byte[ ] Encrypt(byte[ ] secretKey, byte[ ] data);
byte[ ] Decrypt(byte[ ] secretKey, byte[ ] data);
}
```

Figure 2:
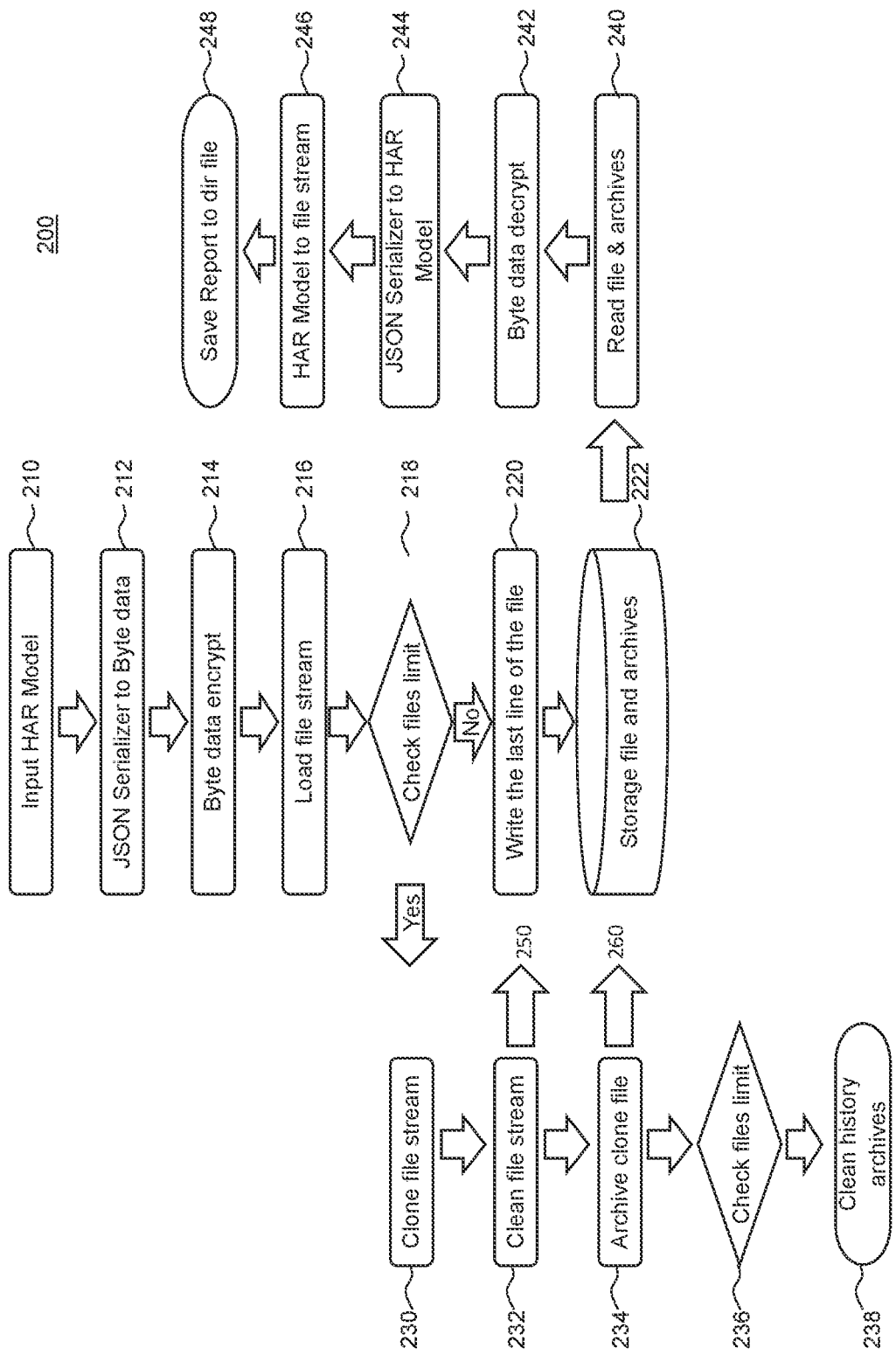
FIG. 2 is a flowchart illustrating a process for capturing a network trace request of listening and recording, according to some embodiments.

In particular, FIG. 2 is a flowchart illustrating a process 200 for capturing a network trace request of listening and recording, according to some embodiments. In step 210, a HAR data model may be input into a system. In step 212, a JSON serializer may convert the data to byte data from using the HAR data model and the data is still serialized. In step 214, the byte data may then be encrypted. In step 216, the local data file may be loaded to a file stream now that the data has been encrypted. In step 218, the size limit of the data may be checked.

If the file is over-limit (yes), the process may proceed to step 230. In step 230, the file stream may be cloned. In step 232, the file stream may be cleaned. Once the file stream is cleaned, the current file stream is an empty container with no content. After cleaning the file stream, the process may proceed to step 220 and step 234. In step 220, the encrypted byte data may be written to the last line of the file. In this case, because the content of the current file stream has been emptied, the last line is actually the first line of the file. In step 234, the cloned file stream is written directly to the new file, which may be archived. After archival, the process may proceed to either step 222 and 236. In step 222, the file may be stored. In step 236, the file size limit may be checked. In step 238, the history archives may be cleaned.

In step 220, the encrypted byte data may be written to the last line of the file. When the listening or recording is occurring, step 220 occurs continuously. In step 222, the file may be stored or archived since the last line of the file was written. Steps 240 to 248 detail the steps of exporting the network trace report. In step 240, the local data file and archives may be read. In step 242, the byte data of the file is decrypted. In step 244, the JSON serializer may deserialize the byte data back to the HAR data model since the data has been decrypted. In step 246, the HAR data model may be sent to a new file stream. In step 248, the file stream of a report may be saved to the directory (i.e., dir).

The process described in FIG. 2 enables reading data records that may be stored in a file and then converted to export the data records to a plaintext readable report file. The content of the written plaintext readable report file may contain, for example, private information. The security of the written file content may be encrypted when it is stored. The written file content may then be decrypted when the report file is exported to a directory.

The listening and recording record report may be exported to a directory. To export the report, three parameters are required: specifying the directory path, the file name, and whether to overwrite a previous existing record report. For the overwrite parameter, the default is false, i.e. to not overwrite. A HTTP archive format method may be created to read all monitoring storage records, which includes archives. The records and archives may be decrypted and the decrypted records may be written to an HAR data model HTTP archive format class. An export all asynchronous method function to serialize the HAR data model into a JSON format data stream may be implemented and written into a specific storage directory file. If the specified storage directory file exists, it will be overwritten.

Figure 3A:
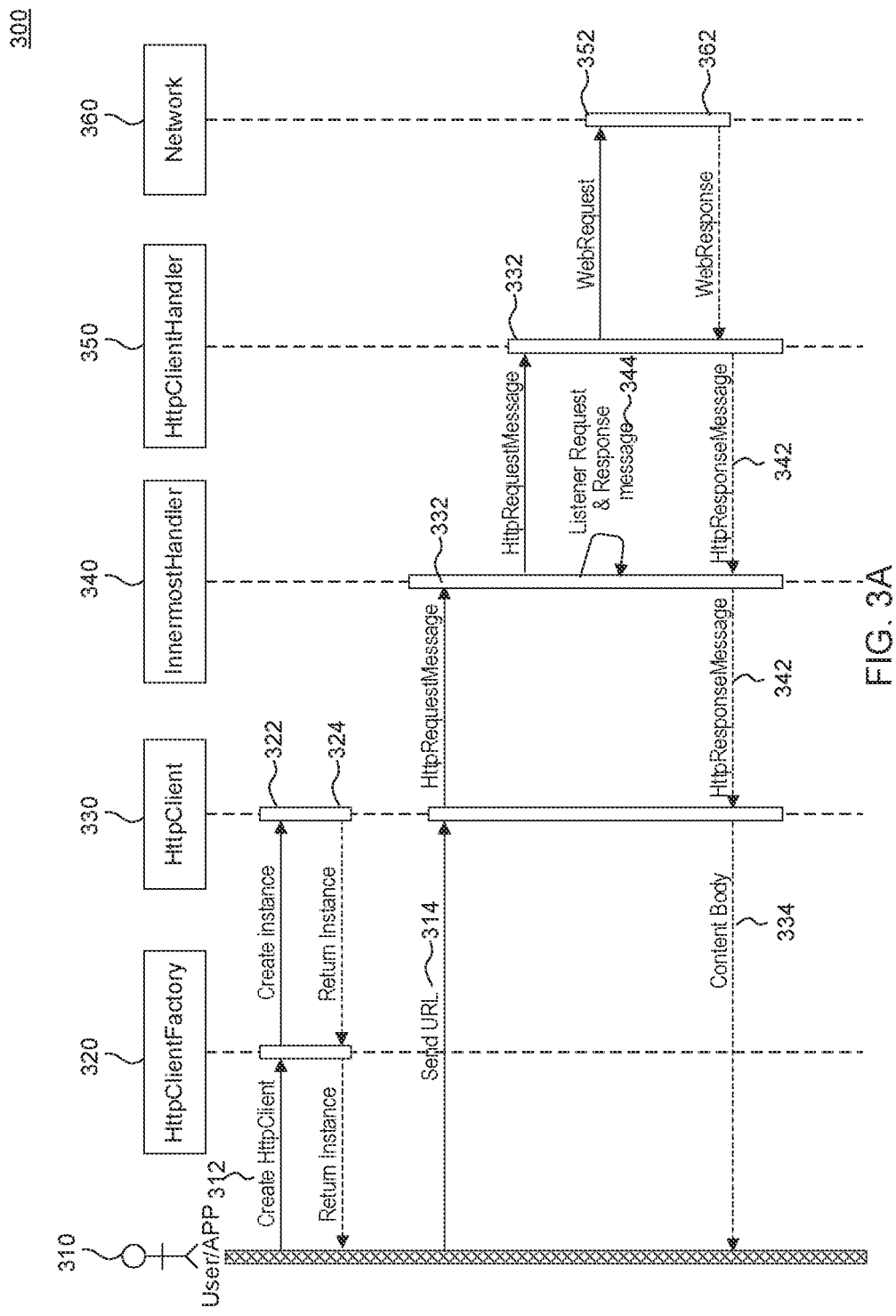
FIG. 3A is a diagram for capturing a network trace request of listening and recording, according to some embodiments.
Figure 3B:
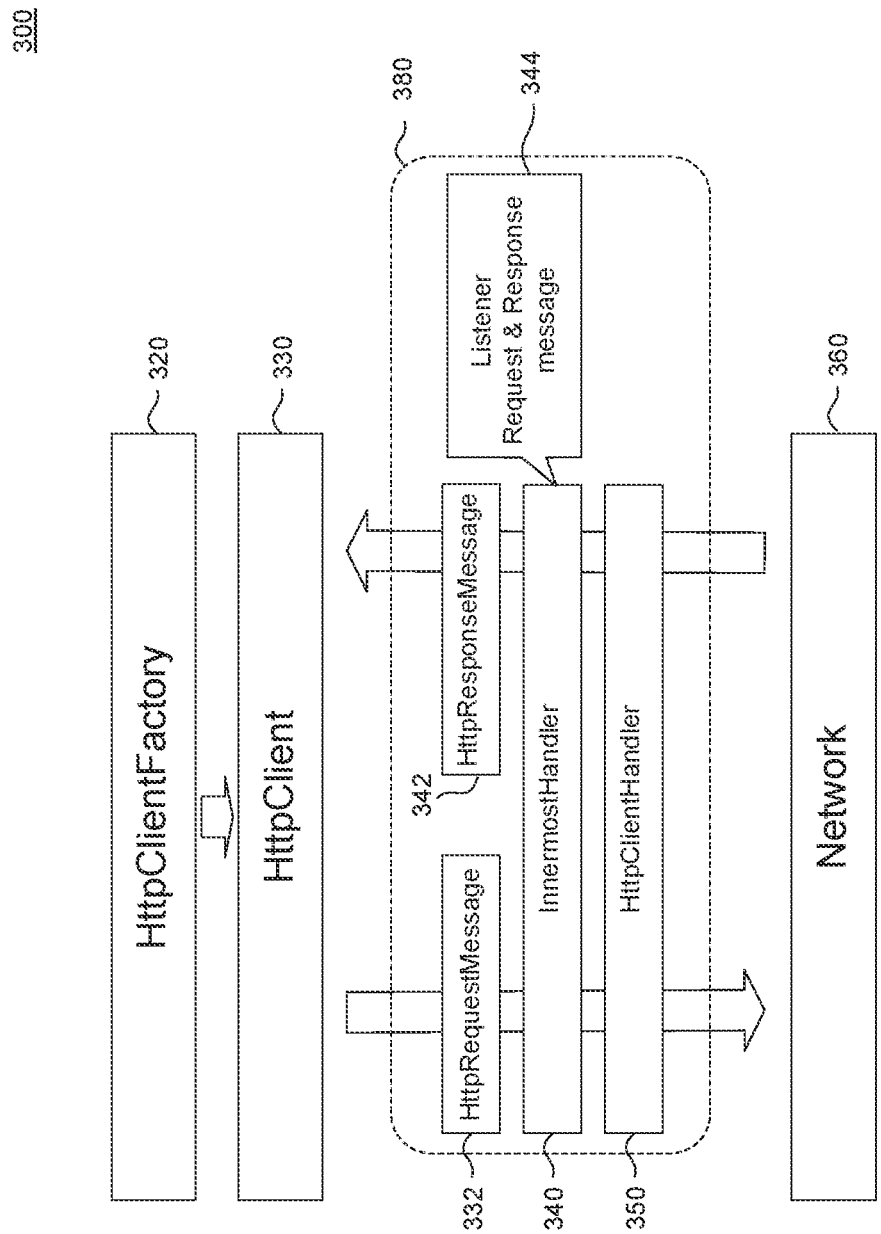
FIG. 3B is an additional diagram for capturing a network trace request of listening and recording, according to some embodiments.

All listening records may be cleaned and deleted. The listening record report export logic is now considered to be complete. FIGS. 3A-3B further describes the sequence of the four steps 102-108 of FIG. 1 herein.

In particular, FIG. 3A is a diagram 300 for capturing a network trace request of listening and recording where the steps may be returned to the end user 310, according to some embodiments. In 312, an end user or application 310 may create an HTTP client 330. An HTTP client factory 320 is a factory class that may create HTTP client instances 322 for an end user or application 310. The application 310 may create an HTTP client 330 through the HTTP client factory 320 to request, for example, URLs. In 314, the URLs may be sent to the H TTP client 330. Furthermore, the HTTP client 330 may implement the innermost handler 340 to request and obtain response information.

In 322, the HTTP client factory 320 may create instances for the HTTP client 330. In 324, the HTTP client 330 may return the instance to either the HTTP client factory 320 or to the application 310. The HTTP client 330 may send an HTTP request message 332 that requests either listening or recording to the innermost handler 340, which may then send the HTTP request message 332 to the HTTP client handler 350. The HTTP client handler 350 may send a web request 352 to the network service layer 360, which then may return a web response 362 to the HTTP client handler 350.

The HTTP client handler 350 may then send a HTTP response message 342 to the innermost handler 340 to actually listen or record, which may then send the HTTP response message 342 to the HTTP client 330. The HTTP client 330 then sends content body 334 back to the application 310. The innermost handler 340 inherits and rewrites a send asynchronous method logic of the HTTP client handler 350 to listen and or record the detailed content and time-consuming of the HTTP request message 332 and HTTP response message 342 before sending in the send asynchronous method logic. The send asynchronous method logic may listen and record the HTTP request message 332 and HTTP response message 342 in the data model created for it and then serialize the data model into the JSON format. The JSON format may be stored in a local directory for subsequent report file export and analysis. In 344, the innermost handler 340 may listen and record both the HTTP request message 332 and HTTP response message 342.

The HTTP client handler 350 is a basic module provided in the framework for data communication with the network service layer 360. The core technology and implementation of this module may be supported, for example, by Windows.

FIG. 3B is an additional diagram 300 for capturing a network trace request of listening and recording, according to some embodiments. The diagram 300 is an architectural diagram of steps 102-108 described in FIG. 1, which is depicted as four layers. The first layer is the HTTP client factory 320, which may be a factory class. The HTTP client factory 320 is responsible for the unified creation and management of HTTP client object instances. The second layer is the HTTP client 330, which is a class and a collection of settings for executing all request applications. The collection of settings is used to initiate HTTP request sessions and receive HTTP responses from the resource indicated by the uniform resource identifier (URI).

The third layer 380 is the network request processing layer. This layer 380 is responsible for sending the HTTP request message 332 to the network service layer 360 via the innermost handler 340 and the HTTP client handler 350. At the innermost handler 340, the listener and recorder request and response message is generated 344.

The fourth layer is the network service layer 360. The network service layer 360 is responsible for the transmission and reception of network information. Here, the network service layer 360 may send the HTTP response message 342 back to the HTTP client 330 via the HTTP client handler 350 and the innermost handler 340. The function of the network service layer 360 may be to return a response immediately after, for example, a HTTP response message 342.

Figure 4:
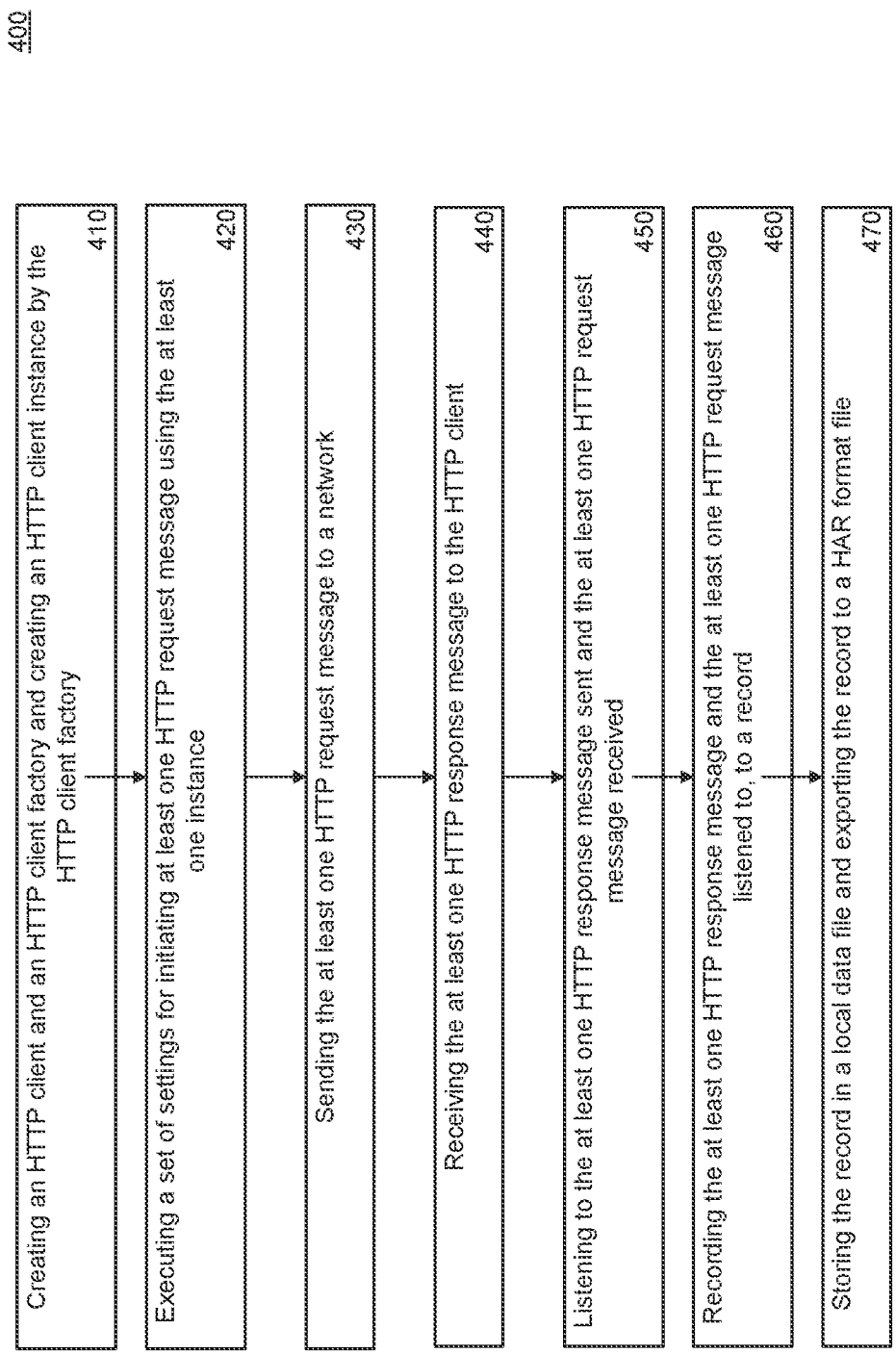
FIG. 4 is an example method for capturing a network trace request of listening and recording, according to some embodiments.

FIG. 4 is an example method 400 for capturing a network trace, according to some embodiments.

In step 410, an HTTP client 330 and HTTP client factory 320 are created and an HTTP client instance is created by the HTTP client factory.

In step 420, a set of settings for initiating at least one HTTP request message 332 using the at least one instance are executed.

In step 430, an HTTP request message 332 is sent to a network service layer 360.

In step 440, an HTTP response message 342 is received by the HTTP client 330. The HTTP response message 342 is received by the HTTP client 330 once the HTTP request message 332 is sent to the network service layer 360.

In step 450, the sent HTTP request message 332 and the received HTTP response message 342 are listened to.

In step 460, the listened HTTP response message 342 and HTTP request message 332 are recorded to a record.

In step 470, the record is stored in a local data file. The local data file may be exported to a HAR format file.

Figure 5:
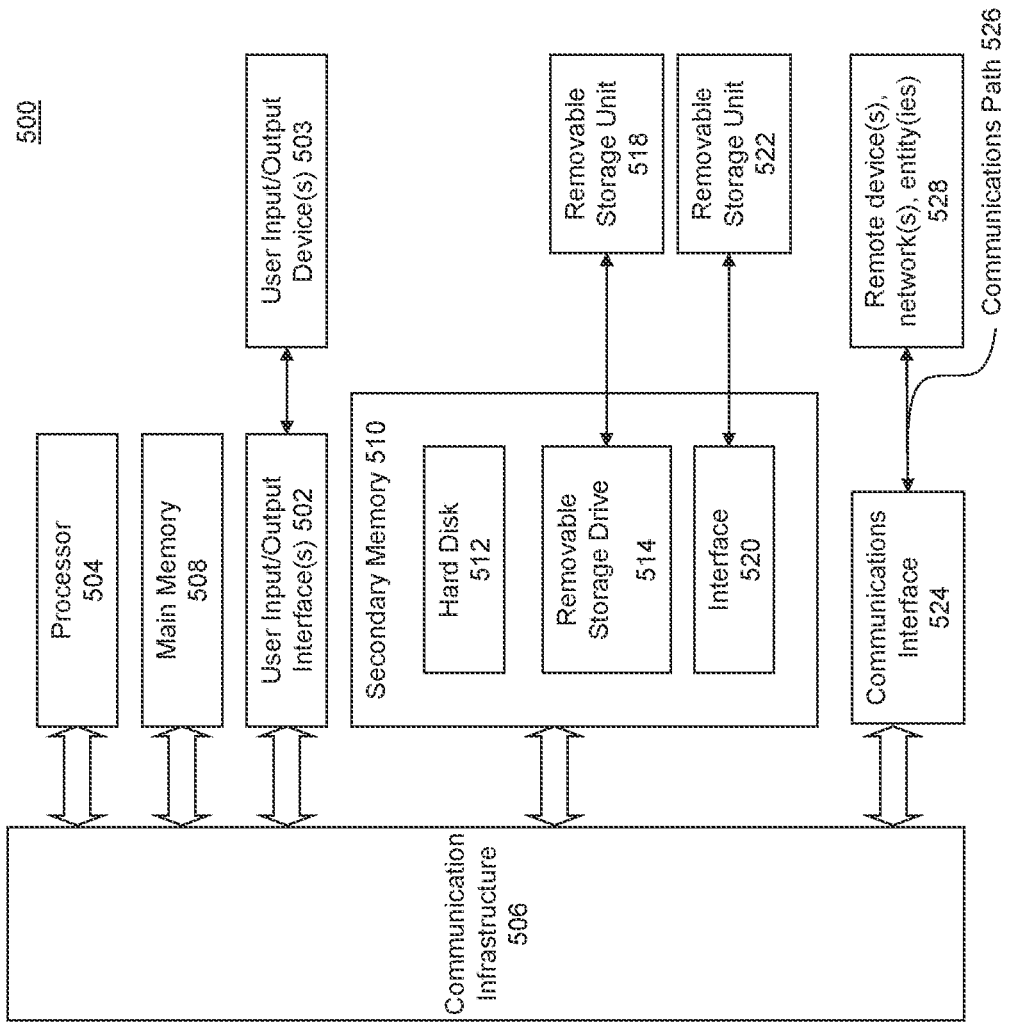
FIG. 5 is an example computer system useful for implementing various embodiments.

Various embodiments may be implemented, for example, using one or more well-known computer systems, such as computer system 500 shown in FIG. 5. One or more computer systems 500 may be used, for example, to implement any of the embodiments discussed herein, as well as combinations and sub-combinations thereof.

Computer system 500 may include one or more processors (also called central processing units, or CPUs), such as a processor 504. Processor 504 may be connected to a communication infrastructure or bus 506.

Computer system 500 may also include user input/output device(s) 503, such as monitors, keyboards, pointing devices, etc., which may communicate with communication infrastructure 506 through user input/output interface(s) 502.

One or more of processors 504 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 500 may also include a main or primary memory 508, such as random access memory (RAM). Main memory 508 may include one or more levels of cache. Main memory 508 may have stored therein control logic (i.e., computer software) and/or data.

Computer system 500 may also include one or more secondary storage devices or memory 510. Secondary memory 510 may include, for example, a hard disk drive 512 and/or a removable storage device or drive 514. Removable storage drive 514 may be a floppy disk drive, a magnetic tape drive, a compact disk drive, an optical storage device, tape backup device, and/or any other storage device/drive.

Removable storage drive 514 may interact with a removable storage unit 518. Removable storage unit 518 may include a computer usable or readable storage device having stored thereon computer software (control logic) and/or data. Removable storage unit 518 may be a floppy disk, magnetic tape, compact disk, DVD, optical storage disk, and/any other computer data storage device. Removable storage drive 514 may read from and/or write to removable storage unit 518.

Secondary memory 510 may include other means, devices, components, instrumentalities or other approaches for allowing computer programs and/or other instructions and/or data to be accessed by computer system 500. Such means, devices, components, instrumentalities or other approaches may include, for example, a removable storage unit 522 and an interface 520. Examples of the removable storage unit 522 and the interface 520 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 500 may further include a communication or network interface 524. Communication interface 524 may enable computer system 500 to communicate and interact with any combination of external devices, external networks, external entities, etc. (individually and collectively referenced by reference number 528). For example, communication interface 524 may allow computer system 500 to communicate with external or remote devices 528 over communications path 526, which may be wired and/or wireless (or a combination thereof), and which may include any combination of LANs, WANs, the Internet, etc. Control logic and/or data may be transmitted to and from computer system 500 via communication path 526.

Computer system 500 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 500 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 500 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 500, main memory 508, secondary memory 510, and removable storage units 518 and 522, as well as tangible articles of manufacture embodying any combination of the foregoing. Such control logic, when executed by one or more data processing devices (such as computer system 500), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 5. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer implemented method for capturing a network trace, comprising:
   creating, by at least one processor, an HTTP client, an HTTP client factory, and at least one instance of the HTTP client;
   initiating, by the at least one processor, at least one HTTP request message using the at least one instance;
   sending, by the at least one processor, the at least one HTTP request message to a network;
   receiving, by the at least one processor, at least one HTTP response message in response to the at least one HTTP request message by the HTTP client;
   listening, by the at least one processor, to the at least one HTTP request message and the at least one HTTP response message; and
   recording, by the at least one processor, the at least one HTTP request message and the at least one HTTP response message to a record.

2. The computer implemented method of claim 1, further comprising encrypting the record.

3. The computer implemented method of claim 1, further comprising transmitting the record to the network.

4. The computer implemented method of claim 3, the transmitting further comprising:
   exporting the record to a specified storage system.

5. The computer implemented method of claim 4, wherein the exported record is a HAR file.

6. The computer implemented method of claim 5, further comprising: analyzing the HAR file to determine an error.

7. The computer implemented method of claim 1, wherein the listening further comprises processing at a handler the at least one HTTP response message.

8. A system, comprising:
a memory; and
at least one processor coupled to the memory and configured to:
create an HTTP client, an HTTP client factory, and at least one instance of the HTTP client;
initiate at least one HTTP request message using the at least one instance;
send the at least one HTTP request message to a network;
receive at least one HTTP response message in response to the at least one HTTP request message by the HTTP client;
listen to the at least one HTTP request message and the at least one HTTP response message; and
record the at least one HTTP request message and the at least one HTTP response message to a record.

9. The system of claim 8, wherein the record is encrypted.

10. The system of claim 8, wherein the record is transmitted to the network.

11. The system of claim 10, wherein to transmit, the at least one processor is further configured to:
export the record to a specified storage system.

12. The system of claim 11, wherein the exported record is a HAR file.

13. The system of claim 12, wherein the HAR file is analyzed to determine an error.

14. The system of claim 8, wherein the listening occurs at a handler that processes the at least one HTTP response message.

15. A non-transitory computer-readable device having instructions stored thereon that, when executed by at least one computing device, cause the at least one computing device to perform operations comprising:
creating an HTTP client, an HTTP client factory, and at least one instance of the HTTP client;
initiating at least one HTTP request message using the at least one instance;
sending the at least one HTTP request message to a network;
receiving at least one HTTP response message in response to the at least one HTTP request message by the HTTP client;
listening to the at least one HTTP request message and the at least one HTTP response message; and
recording the at least one HTTP request message and the at least one HTTP response message to a record.

16. The non-transitory computer-readable device of claim 15, wherein the record is encrypted.

17. The non-transitory computer-readable device of claim 15, the operations further comprising transmitting the record to the network.

18. The non-transitory computer-readable device of claim 17, the transmitting further comprising:
exporting the record to a specified storage system.

19. The non-transitory computer-readable device of claim 18, wherein the exported record is a HAR file.

20. The non-transitory computer-readable device of claim 19, wherein the HAR file is analyzed to determine an error.

* * * * *